US012291201B2

(12) United States Patent
Kato

(10) Patent No.: US 12,291,201 B2
(45) Date of Patent: May 6, 2025

(54) TRAVEL CONTROL APPARATUS, VEHICLE, TRAVEL CONTROL METHOD, AND NON-TRANSITORY COMPUTER-READABLE STORAGE MEDIUM

(71) Applicant: HONDA MOTOR CO., LTD., Tokyo (JP)

(72) Inventor: Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 105 days.

(21) Appl. No.: 17/190,614

(22) Filed: Mar. 3, 2021

(65) Prior Publication Data
US 2021/0284148 A1    Sep. 16, 2021

(30) Foreign Application Priority Data

Mar. 13, 2020 (JP) ................. 2020-044375

(51) Int. Cl.
*B60W 30/12* (2020.01)
(52) U.S. Cl.
CPC ....... *B60W 30/12* (2013.01); *B60W 2420/403* (2013.01); *B60W 2420/408* (2024.01); *B60W 2552/53* (2020.02)
(58) Field of Classification Search
CPC ............. B60W 30/12; B60W 2420/42; B60W 2420/52; B60W 2552/53; B60W 30/165;
(Continued)

(56) References Cited

U.S. PATENT DOCUMENTS 7,272,482 B2    9/2007 Kubota
9,884,624 B2 *  2/2018 Morita ............... B60W 30/165
(Continued)

FOREIGN PATENT DOCUMENTS

CN    108238048 A    7/2018
CN    108973994 A    12/2018
(Continued)

OTHER PUBLICATIONS

Translation of JPH10261065A retrieved from JPlatPat on 05/096/2023 (Year: 2023).*
(Continued)

*Primary Examiner* — Fadey S. Jabr
*Assistant Examiner* — Faris Asim Shaikh
(74) *Attorney, Agent, or Firm* — Thomas Horstemeyer, LLP

(57) ABSTRACT

There is provided a travel control apparatus. A control unit executes, based on a recognition result of the division line by a recognition unit, first control to perform lane keeping of the self-vehicle. In a case in which the recognition result ceases to be satisfied a predetermined condition, the control unit will switch, at a first timing. Even in a case in which the recognition result ceases to be satisfied the predetermined condition, if the predetermined condition ceases to be satisfied due to a recognition result of a width of a travel lane of the self-vehicle, the control unit will switch the control to be executed from the first control to the second control at a second timing earlier than the first timing.

9 Claims, 6 Drawing Sheets

(58) Field of Classification Search
CPC ........... B60W 30/182; B60W 2552/00; B60W 40/06; B60W 30/09; B60W 2554/00; G06V 10/44; G06V 20/58; G06V 20/56; G06T 2210/21; G06T 2207/10016; G06T 2210/61; G06T 19/003; G06T 2207/30241; G06T 2207/30252; G06T 7/73; G06T 2207/20076; G06T 2207/30261; G06T 15/205; G06T 2207/10048; G06T 2207/20021; G06T 7/11; G06T 2207/20081; G06T 2207/20084; G06T 2207/20104; G06T 7/251; G06T 7/277; G08G 1/22; G08G 1/166; G08G 1/16; G08G 1/04; G08G 1/167; G08G 9/02; G08G 1/0129; G08G 1/017; G08G 1/052; B60G 2600/0422; B60G 2800/166; B60R 2300/301; B60R 2300/305; B60R 21/013; B60R 1/22; B60R 2300/302; G05D 1/0274; G05D 2201/0213; B62D 15/021; B62D 15/0275; B62D 15/0295; G02B 2027/0138; G06F 3/005; B60Q 9/008; G06N 3/08; Y02T 10/40

See application file for complete search history.

(56) References Cited

U.S. PATENT DOCUMENTS

| | | | | |
|---|---|---|---|---|
| 10,203,699 | B1* | 2/2019 | Kim | H04W 12/08 |
| 10,515,278 | B2 | 12/2019 | Ide | |
| 2003/0031008 | A1* | 2/2003 | Kobayashi | B60Q 1/085 |
| | | | | 362/464 |
| 2004/0061626 | A1 | 4/2004 | Kubota | |
| 2006/0239509 | A1* | 10/2006 | Saito | G06V 10/753 |
| | | | | 701/1 |
| 2007/0198162 | A1* | 8/2007 | Kubota | B60W 30/165 |
| | | | | 701/96 |
| 2015/0291216 | A1* | 10/2015 | Sato | B62D 15/0265 |
| | | | | 701/41 |
| 2016/0229402 | A1* | 8/2016 | Morita | G08G 1/166 |
| 2017/0166124 | A1* | 6/2017 | Nakagawa | G08G 1/163 |
| 2017/0361841 | A1* | 12/2017 | Kojo | B60W 30/165 |
| 2018/0181820 | A1* | 6/2018 | Ide | G08G 1/167 |
| 2018/0197414 | A1* | 7/2018 | Oooka | B60T 7/12 |
| 2018/0346019 | A1* | 12/2018 | Fujii | B62D 6/001 |
| 2018/0348779 | A1 | 12/2018 | Oniwa | |
| 2018/0354489 | A1* | 12/2018 | Stayton | B60W 10/20 |
| 2019/0251845 | A1* | 8/2019 | Kosaka | G06V 20/588 |
| 2019/0308623 | A1* | 10/2019 | Sato | G06V 20/588 |
| 2019/0308625 | A1* | 10/2019 | Iimura | B60W 30/146 |
| 2019/0337513 | A1* | 11/2019 | Kim | B60W 30/12 |
| 2020/0070826 | A1* | 3/2020 | Watanabe | G08G 1/167 |
| 2020/0094828 | A1* | 3/2020 | Ohmura | B62D 15/0265 |
| 2020/0339119 | A1* | 10/2020 | Ohmura | B60W 30/12 |
| 2021/0295689 | A1* | 9/2021 | Lee | G01C 21/3415 |

FOREIGN PATENT DOCUMENTS

| | | | | |
|---|---|---|---|---|
| CN | 109476306 A | | 3/2019 | |
| CN | 109987091 A | | 7/2019 | |
| JP | H10261065 A | * | 9/1998 | ........... G06V 20/588 |
| JP | 2018-103863 A | | 7/2018 | |
| KR | 20190067040 A | * | 6/2019 | ........... B60W 30/12 |

OTHER PUBLICATIONS

Translation of KR-20190067040-A retrieved from PE2E Search on May 2, 2024 (Year: 2024).*
Chinese Office Action for Chinese Patent Application No. 20110255842.1 mailed Sep. 28, 2023.

* cited by examiner

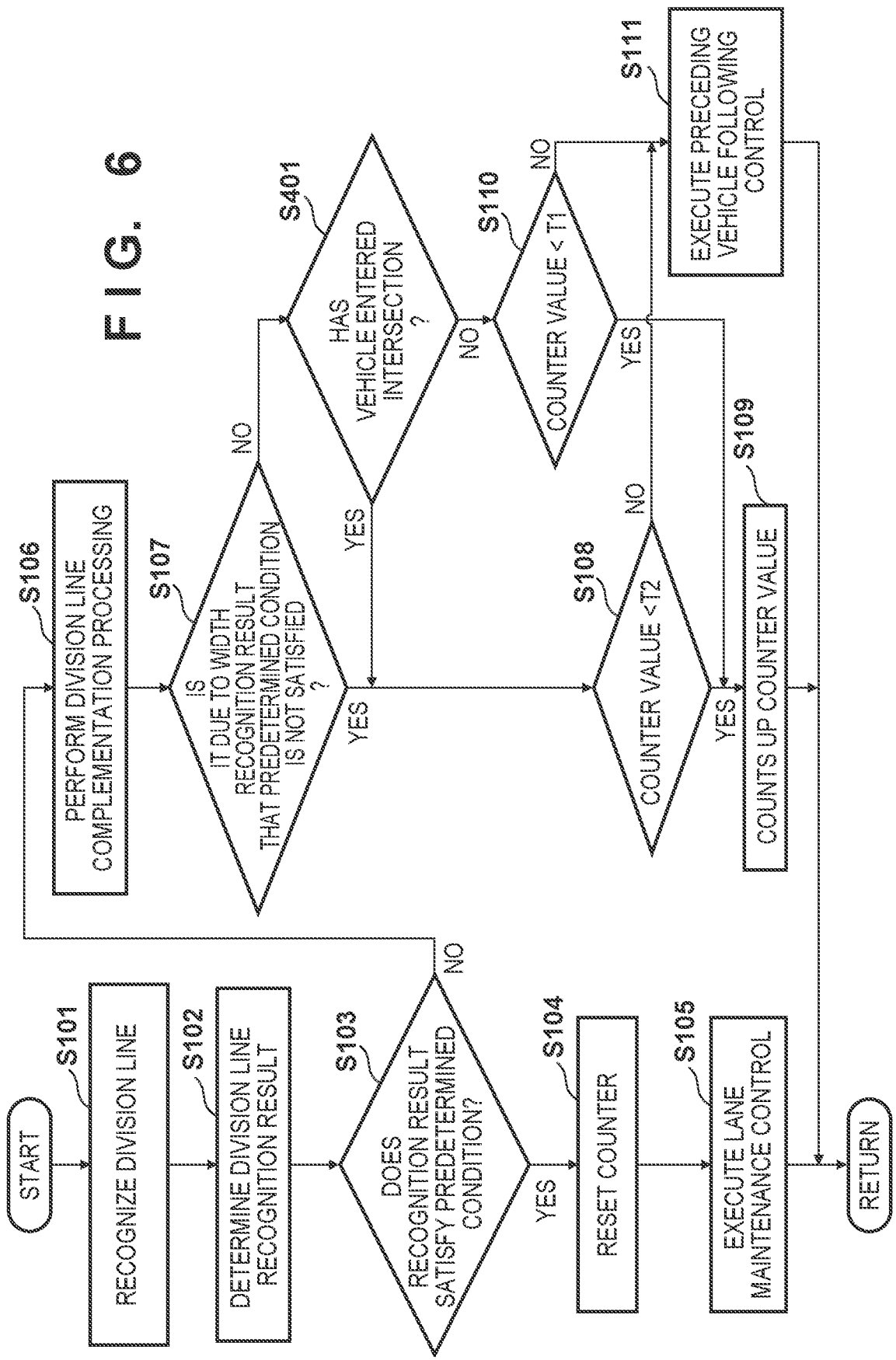

TRAVEL CONTROL APPARATUS, VEHICLE, TRAVEL CONTROL METHOD, AND NON-TRANSITORY COMPUTER-READABLE STORAGE MEDIUM

CROSS-REFERENCE TO RELATED APPLICATION

This application claims priority to and the benefit of Japanese Patent Application No. 2020-044375 filed on Mar. 13, 2020, the entire disclosure of which is incorporated herein by reference.

BACKGROUND OF THE INVENTION

Field of the Invention

The present invention relates to a travel control apparatus, a vehicle, a travel control method, and a non-transitory computer-readable storage medium.

Description of the Related Art

A vehicle that can recognize a division line of a road on which the self-vehicle is traveling and execute lane keeping control to keep the travel lane based on the recognized division line is known. Japanese Patent Laid-Open No. 2018-103863 discloses a technique for switching control, in a vehicle which is performing lane keeping control, to preceding-vehicle following control for following a preceding vehicle, in a case in which a white line cannot be recognized by a camera sensor.

SUMMARY OF THE INVENTION

According to one embodiment of the present invention, there is provided with a travel control apparatus comprising: a recognition unit configured to recognize a division line of a road on which a self-vehicle is traveling; and a control unit configured to execute, based on a recognition result of the division line by the recognition unit, first control to perform lane keeping of the self-vehicle, wherein in a case in which the recognition result ceases to be satisfied a predetermined condition, the control unit will switch, at a first timing after the division line recognized by the recognition unit has been complemented and the first control has been continued, control to be executed from the first control to second control to follow a preceding vehicle of the self-vehicle, and even in a case in which the recognition result ceases to be satisfied the predetermined condition, if the predetermined condition ceases to be satisfied due to a recognition result of a width of a travel lane of the self-vehicle, the control unit will switch the control to be executed from the first control to the second control at a second timing earlier than the first timing.

According to another embodiment of the present invention, there is provided a vehicle incorporating the above travel control apparatus.

According to still another embodiment of the present invention, there is provided a vehicle control method comprising: recognizing a division line of a road on which a self-vehicle is traveling; and executing, based on a recognition result of the division line obtained in the recognizing, first control to perform lane keeping of the self-vehicle, wherein in the executing, in a case in which the recognition result ceases to be satisfied a predetermined condition, control to be executed will be switched, at a first timing after the division line recognized in the recognizing has been complemented and the first control has been continued, from the first control to second control to follow a preceding vehicle of the self-vehicle, and even in a case in which the recognition result ceases to be satisfied the predetermined condition, if the predetermined condition ceases to be satisfied due to a recognition result of a width of a travel lane of the self-vehicle, the control to be executed will be switched from the first control to the second control at a second timing earlier than the first timing.

According to still yet another embodiment of the present invention, there is provided a non-transitory computer-readable storage medium storing a program for causing a computer to function as each unit of a recognition unit configured to recognize a division line of a road on which a self-vehicle is traveling; and a control unit configured to execute, based on a recognition result of the division line by the recognition unit, first control to perform lane keeping of the self-vehicle, wherein in a case in which the recognition result ceases to be satisfied a predetermined condition, the control unit will switch, at a first timing after the division line recognized by the recognition unit has been complemented and the first control has been continued, control to be executed from the first control to second control to follow a preceding vehicle of the self-vehicle, and even in a case in which the recognition result ceases to be satisfied the predetermined condition, if the predetermined condition ceases to be satisfied due to a recognition result of a width of a travel lane of the self-vehicle, the control unit will switch the control to be executed from the first control to the second control at a second timing earlier than the first timing.

BRIEF DESCRIPTION OF THE DRAWINGS

FIG. 6 is a flowchart showing an example of processing of the control unit.

DESCRIPTION OF THE EMBODIMENTS

Figure 1:
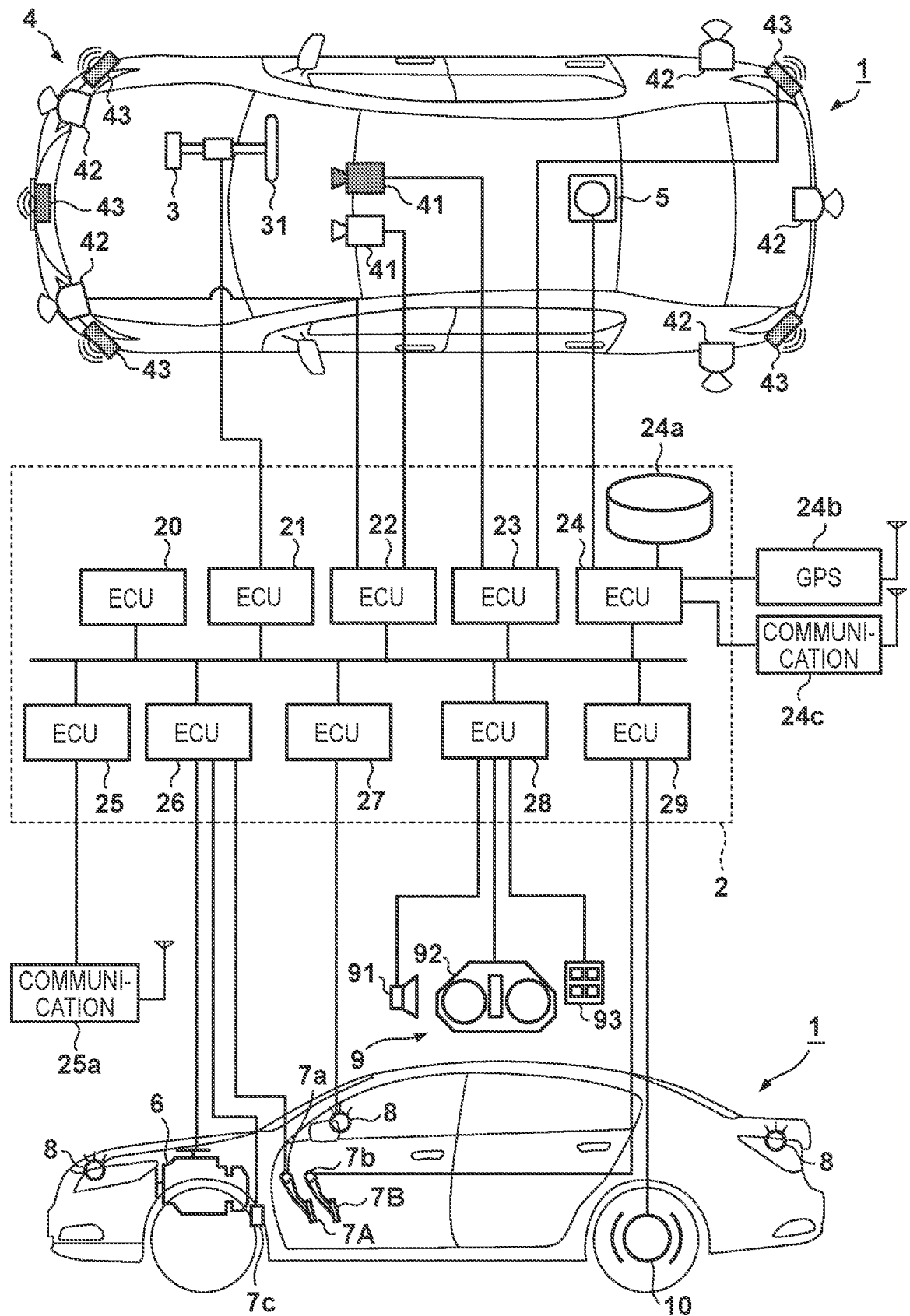
FIG. 1 is a block diagram of a vehicle control apparatus according to an embodiment.

In the above-described related art, a switch from lane keeping control to preceding vehicle following control can be performed at a more appropriate timing in accordance with the state of the periphery or the like.

An embodiment of the present invention provides a technique to switch from lane keeping control to preceding vehicle following control at an even more appropriate timing.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram of a vehicle control apparatus according to an embodiment of the present invention and controls a vehicle 1. FIG. 1 shows the outline of the vehicle 1 by a plan view and a side view. The vehicle 1 is, for example, a sedan-type four-wheeled vehicle. Note that in the following description, the left and right directions are based on a state facing the direction of forward movement of the vehicle 1.

A vehicle control apparatus of FIG. 1 includes a control unit 2. The control unit 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. In addition, each ECU may include a dedicated integrated circuit such as an ASIC or the like for executing the processing of each ECU instead of these components.

The functions and the like provided by the ECUs 20 to 29 will be described below. Note that the number of ECUs and the provided functions can be appropriately designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, the ECU 20 will execute control to stop the vehicle 1 by automatically controlling at least the steering of the vehicle 1. In this manner, from one aspect, the ECU 20 functions as a travel control apparatus of the vehicle 1.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the front of the roof of the vehicle 1. When images captured by the cameras 41 are analyzed, the contour of a target or a division line (a white line or the like) of a lane on a road can be extracted.

The detection unit 42 is Light Detection and Ranging (LiDAR) (to be sometimes referred to as the LiDAR 42 hereinafter), and detects a target around the vehicle 1 or measures the distance to a target. In this embodiment, five LiDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LIDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LIDARs, radars, and sonars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle in the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice (words). A display device 92 notifies the driver of information by displaying an image. The display device 92 is arranged, for example, in front of the driver's seat and constitutes an instrument panel or the like. Note that although notification by voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to keep the stationary state of the vehicle 1. In addition, if the transmission of the power plant 6 includes a parking lock mechanism, it can be operated to keep the stationary state of the vehicle 1.

<Switch from Lane Maintenance Control to Preceding Vehicle Following Control>

In this embodiment, the control unit 2 executes, as one mode of automated driving and driving support, lane keeping control to perform lane keeping of the vehicle 1 as the self-vehicle. For example, the control unit 2 recognizes a division line or the like that divides the travel lane of the vehicle 1 based on a detection result from each camera 41, and controls the steering and the braking of the vehicle 1 so the vehicle 1 will travel in the center of the travel lane.

In a case in which it becomes difficult to recognize the division line or it is determined that the length of a recognizable division line is insufficient during lane keeping control, it may become difficult to continue the lane keeping control. In this embodiment, the control unit 2 switches the control to be executed from the lane keeping control to the preceding vehicle following control which is control performed to follow a preceding vehicle. For example, the control unit 2 estimates, based on a detection result from the cameras 41 or the like, the track of travel of a preceding vehicle traveling ahead of the vehicle 1, and controls the steering and the braking of the vehicle 1 so the self-vehicle will follow the estimated track of travel. As a result, it will be possible to continue automated driving or driving support even in a case in which the continuation of the lane keeping control is difficult or the like.

However, the switch from the lane keeping control to the preceding vehicle following control may influence the behavior of the vehicle 1 depending on the timing of the switch. For example, if lane keeping control is uniformly switched to preceding vehicle following control when the control unit 2 has stopped recognizing the division line, the vehicle 1 may unnecessarily move in the width direction by following a preceding vehicle in a case in which the preceding vehicle has made a lane change.

Hence, in this embodiment, the following processing is executed to switch from the lane keeping control to the preceding vehicle following control at a more appropriate timing.

<Processing Example 1 of Control Unit 2>

Figure 2:
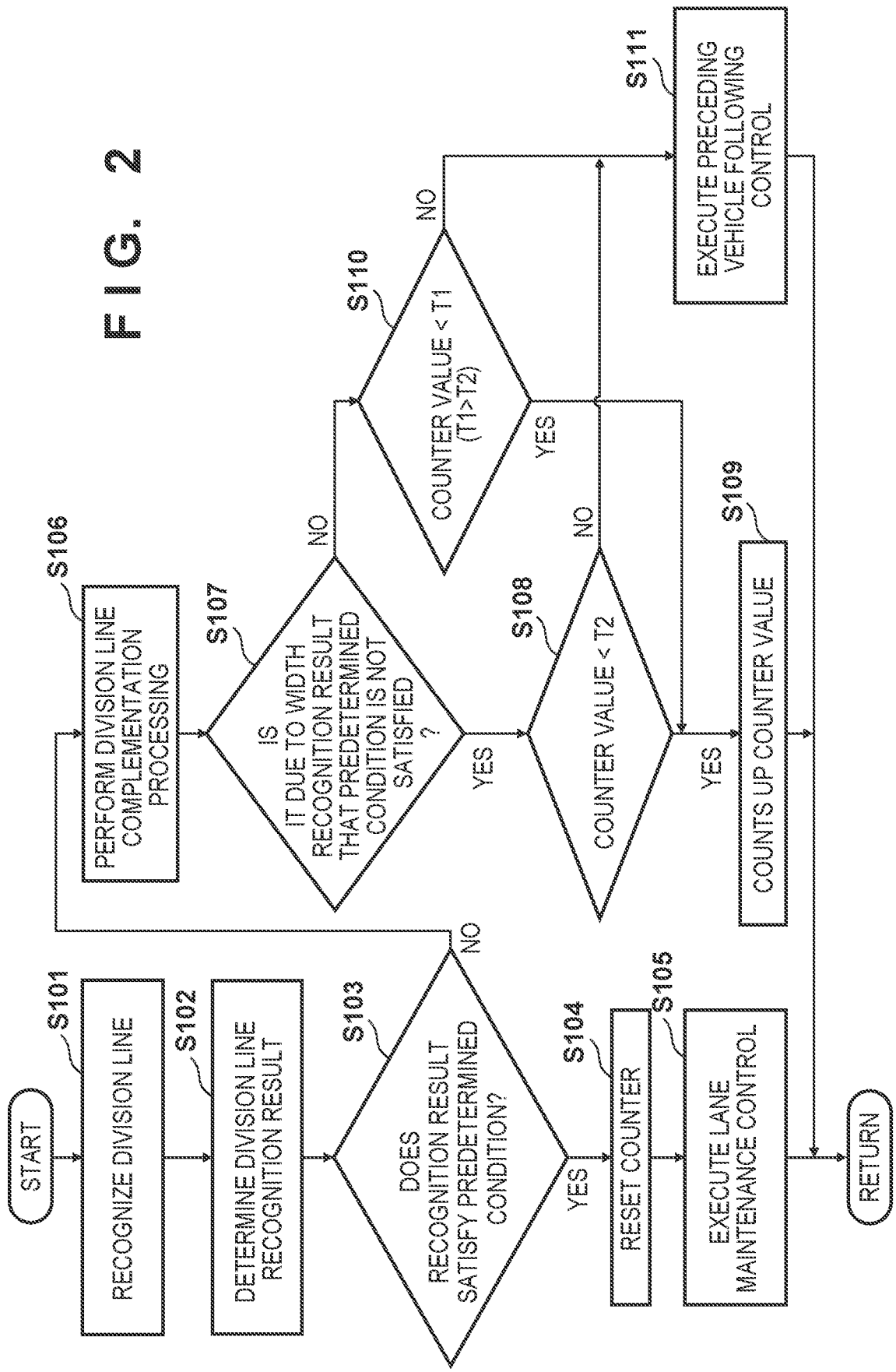
FIG. 2 is a flowchart showing an example of processing of a control unit.

FIG. 2 is a flowchart showing an example of processing of the control unit 2, and shows an example of processing performed when the vehicle 1 traveling by automated driving. More specifically, an example of processing performed when the control unit 2 is to switch the control to the preceding vehicle following control, for following a preceding vehicle, in accordance with a predetermined condition during the execution of the lane keeping control of the vehicle 1 as the self-vehicle is shown. The control unit 2 can periodically execute this processing during the execution of automated driving. In the following description, assume that the lane keeping control has already been executed in the initial state and that a counter value is 0.

The processing of FIG. 2 is implemented by, for example, the processor of each ECU of the control unit 2 executing a program stored in the ECU. Alternatively, dedicated hardware (for example, a circuit) may be used to execute at least some of the processes of these steps.

In step S101, the ECU 22 recognizes a division line. In one embodiment, the ECU 22 recognizes each division line on a road, on which the self-vehicle is traveling, by analyzing an image captured by the corresponding camera 41. The ECU 22 can also recognize, in addition to each division line, roadside objects such as guardrails, curbstones, or the like. Note that division line recognition may be performed by using other external sensors such as LiDAR, radar, and the like, or may be performed by using a combination of these external sensors and the camera. Note that the ECU 23 may also perform division line recognition instead of the ECU 22 or the ECU 22 and the ECU 23 may cooperate to perform the division line recognition.

In step S102, the ECU 20 determines the division line recognition result. In one embodiment, the ECU 20 determines whether the division line recognition result obtained in step S101 satisfies a predetermined condition. For example, the predetermined condition can be set based on a point of view as to whether the reliability of the recognized division line is sufficient to execute lane keeping control.

As the predetermined condition, a condition related to the width of the travel lane can be used. More specifically, a state in which the width of the travel lane is less than a predetermined range, a state in which an amount of change of the width per unit time is equal to or less than a predetermined threshold, or the like can be set as the predetermined condition. In one embodiment, the predetermined range of the width can be determined with consideration to the lane width and the error based on the map information obtained by the communication device 24c. Alternatively, in one embodiment, if the amount of change (decrease or increase) falls within a value which is 30% to 50% of a width that serves as a reference, it may be determined that the amount of change of the width is equal to or less than the threshold.

Also, for example, a state in which a division line is being recognized, a state in which the length of a recognized division line is equal to or more than a predetermined value, or the like may be used as the predetermined condition. For example, the ECU 20 may determine whether each of a plurality of conditions set as predetermined conditions has been satisfied, and determine that the predetermined conditions have been satisfied if all of the set conditions have been satisfied.

In step S103, based on the determination result obtained in step S102, the ECU 20 advances the process to step S104 if the division line recognition result satisfies the predetermined condition, and advances the process to step S106 if the division line recognition result does not satisfy the predetermined condition. That is, the ECU 20 advances the process to step S104 if the division line recognition result is normal, but advances the process to step S106 if the division line recognition result is abnormal.

In step S104, the ECU 20 resets a counter. In step S105, the ECU 20 executes lane keeping control and ends the current processing cycle. For example, if the lane keeping control has already been executed in the previous processing cycle, the ECU 20 will continue the control operation. If the preceding vehicle following control has been executed in the preceding processing cycle, the control operation will be switched to the lane keeping control.

In step S106, the ECU 20 performs division line complementation processing. If the division line recognition result does not satisfy the predetermined condition (NO in step S103), it can be considered that each division line has not been recognized or the reliability of the recognized division line is insufficient for executing lane keeping control. Hence, the ECU 20 will continue executing the lane keeping control upon performing complementation processing such as extrapolating the division line from a past recognition result or the like. Note that a case in which the reliability of the division line is insufficient may be, for example, a case in which only a division line near the vehicle 1 can be recognized while a division line far from the vehicle 1 cannot be recognized or the like.

In step S107, the ECU 20 confirms whether the division line recognition result does not satisfy the predetermined condition due to a width recognition result. If it is determined that the predetermined condition is not satisfied due to the width recognition result, the ECU 20 advances the process to step S108. If it is determined that the predetermined condition is not satisfied due to a factor other than the width recognition result, the process advances to step S110. In other words, if the predetermined condition is not satisfied due to an abnormality in the width of the travel lane, the ECU 20 will advance the process to step S108. Otherwise, the process will advance to step S110. A case in which the predetermined condition is not satisfied due to the width recognition result may be, for example, a case in which the amount of change in the width has exceeded a threshold, a case in which the width has exceeded the threshold and has increased, or the like.

In step S108, the ECU 20 confirms whether the counter value<a threshold T2. If it is determined to be "YES", the process advances to step S109. If it is determined to be "NO", the process advances to step S111.

In step S109, the ECU 20 counts up the counter value by 1 and ends the current processing cycle.

In step S110, the ECU 20 confirms whether counter value<a threshold T1. If it is determined to be "YES", the process advances to step S109. If it is determined to be "NO", the process advances to step S111.

In step S111, the ECU 20 executes the preceding vehicle following control and ends the current processing cycle. For example, if the preceding vehicle following control has already been executed in the previous processing cycle, the ECU 20 will continue the control operation. If the lane keeping control has been executed in the previous processing cycle, the control operation is switched to the preceding vehicle following control.

In this embodiment, it is set to be the threshold T1>the threshold T2. Hence, the control operation will be switched to the preceding vehicle following control at an earlier timing in a case in which the predetermined condition ceases to be satisfied due to the width recognition result than in a case in which the predetermined condition ceases to be satisfied due to a factor other than the width recognition result. In one embodiment, it may be set so that the threshold T1=5 to 10 (counter value) and threshold T2=2 to 4 (counter value).

From one aspect, in a case in which the division line recognition result ceases to be satisfied the predetermined condition, the ECU 20 will switch from the lane keeping control to the preceding vehicle following control at the timing at which "the counter value=the threshold T1" after the corresponding division line has been complemented and the lane keeping control has been continued. On the other hand, in a case in which the predetermined condition ceases to be satisfied due to the width recognition result, the control operation will be switched from the lane keeping control to the preceding vehicle following control at the timing at which "the counter value=the threshold T2", which is a timing earlier than the timing at which "the counter value=the threshold T1".

In addition, if the predetermined condition is satisfied before the counter value has reached the threshold T1 or the threshold T2 in a case in which the lane keeping control is being continued by performing division line complementation processing, the counter value will be reset, and the control operation will return to the normal lane keeping control. In this manner, the ECU 20 can return the control operation to the normal lane keeping control when the division line recognition result has returned to normal while the complementation processing is being continued.

<Operation Example of Vehicle Based on Processing of Control Unit 2>

Figure 3:
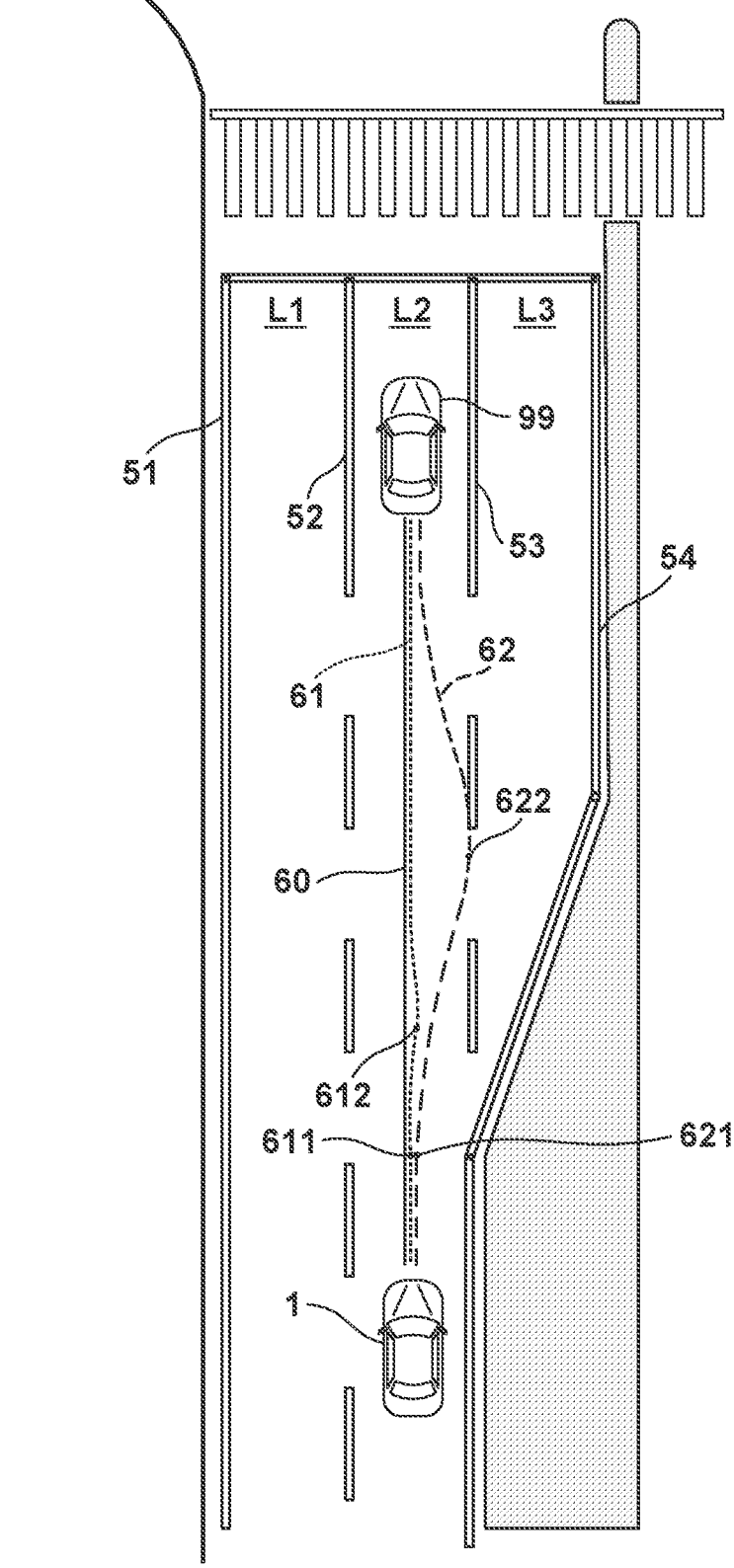
FIG. 3 is a view for explaining an operation of a vehicle of an example of the processing of FIG. 2.

FIG. 3 is a view for explaining an operation example of the vehicle 1 according to the example of processing of FIG. 2. FIG. 3 shows an operation example of the vehicle 1 when the vehicle 1 is to enter an intersection. More specifically, it shows an operation example 1 of the vehicle 1 in a case in which the width of the road increases near the intersection due to a right turn lane. However, the processing of FIG. 2 is also applicable to states other than a case in which the vehicle 1 is to enter an intersection.

The control unit 2 recognizes a division line 52 and a division line 53 dividing a travel lane L2 on which the vehicle 1 is traveling (step S101). Here, if it is determined that the recognition result satisfies the predetermined condition (YES in steps S102 and S103), the control unit 2 will control, based on the recognized division lines 52 and 53, the steering and the braking of the vehicle 1 so the vehicle 1 will travel in the center of the travel lane L2 (step S105). Hence, the vehicle 1 will travel along a travel track 60.

On the other hand, in an intersection where the number of lanes increases due to a right turn lane as shown in FIG. 3, the ECU 22 may not be able recognize that the division line 53 will change from a solid line to a broken line, and may erroneously recognize a division line 54 as the right division line of the travel lane L2 of the vehicle 1. That is, the ECU 20 may erroneously recognize the width of the travel lane L2 to be wider than the actual width. In such a case, the ECU 20 will determine that the division line recognition result does not satisfy the predetermined condition (NO in step S103), and will continue (from a position 611 to a position 612) the lane keeping control while performing the division line complementation processing (step S106). Also, since the predetermined condition ceases to be satisfied due to the width recognition result of the travel lane in this case (step S107), the ECU 20 will switch (step S111, after the position 612) the control operation to the preceding vehicle following control to follow a preceding vehicle 99 at the timing at which "the counter value=the threshold T2". In this manner, in a case in which the ECU 22 has erroneously recognized the division line 54 as the right division line of the travel lane L2 of the vehicle 1, the vehicle 1 will travel along a travel track 61.

FIG. 3 also shows, as a comparative example, a travel track 62 of a case in which the control operation is not switched to the preceding vehicle following control at an earlier timing when the recognition error of the width has occurred. In this case, the ECU 20 will switch the control operation to the preceding vehicle following control at the timing at which "the counter value=the threshold T1" instead of the timing at which "the counter value=the threshold T2". Hence, the distance traveled by continuing the lane keeping control while performing the complementation processing will increase (from a position 621 to a position 622), and the vehicle 1 will move to the side of a travel lane L3 in the vehicle width direction. Subsequently, since the control operation will switch to the preceding vehicle following control and the vehicle 1 will follow the preceding vehicle 99, the vehicle 1 will move to the center of the travel lane L2 again in the vehicle width direction. In this manner, the vehicle 1 will waver in the vehicle width direction.

In this embodiment, the wavering of the vehicle 1 can be suppressed because the ECU 20 will switch to the preceding vehicle following control at an early timing in a case in which the predetermined condition ceases to be satisfied due to the width recognition result of the travel lane. In addition, since the ECU 20 will continue the lane keeping control while performing the complementation processing for a predetermined period in a case in which the predetermined condition ceases to be satisfied due to a factor other than the width of the travel lane, it will be possible to suppress a state in which the vehicle 1 will move unnecessarily in the vehicle width directions due to the preceding vehicle making a lane change or the like. Therefore, the behavior of the vehicle 1 in the vehicle width directions can be stabilized in a case in which the width of the travel lane is abnormal.

<Processing Example 2 of Control Unit 2>

Figure 4:
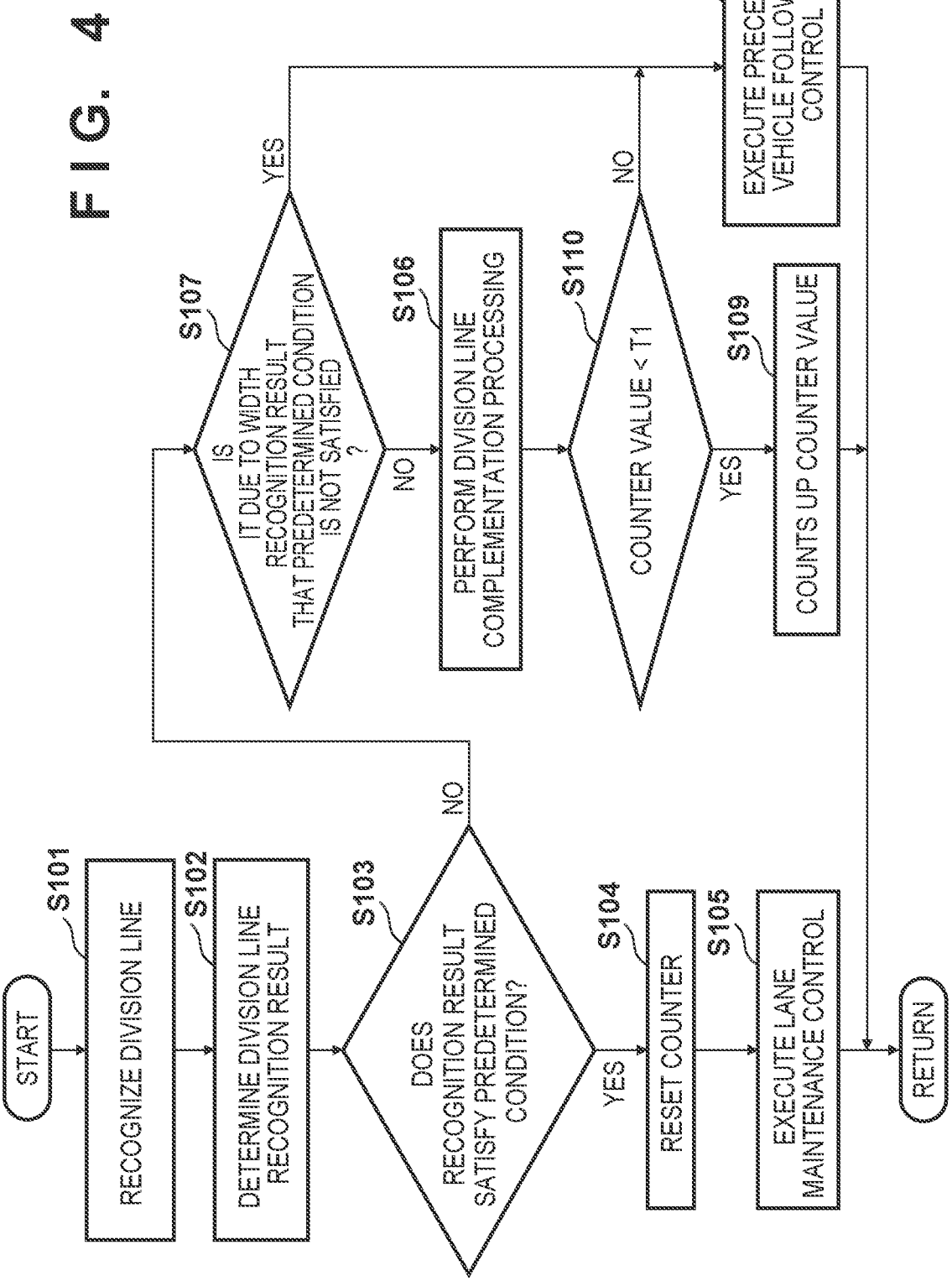
FIG. 4 is a flowchart showing an example of processing of the control unit.

FIG. 4 is a flowchart showing an example of processing of the control unit 2, and shows an example of processing performed when the vehicle 1 is traveling by automated driving. A processing example 2 differs from the processing example 1 in the point that division line complementation processing will not be performed in a case in which the predetermined condition is not satisfied due to the width recognition result. More specifically, the processing example 2 differs from the processing example 1 in that the process of step S108 is not performed and the order of some of the steps is different. A description of arrangements similar to those of the processing example 1 will be omitted hereinafter.

The procedure of processing from step S101 to step S105 is similar to that of the processing example 1.

However, in a case in which "NO" is determined in step S103, the ECU 20 will advance to step S107 instead of step S106 to determine whether the predetermined condition is not satisfied due to the width recognition result. If it is determined that the predetermined condition is not satisfied due to the width recognition result (YES in step S107), the ECU 20 will advance to process to step S111 to switch the control operation to the preceding vehicle following control. That is, even in a case in which the division line recognition result does not satisfy the predetermined condition, as long as it is determined that the predetermined condition is not satisfied due to the width recognition result, the ECU 20 will switch the control operation to the preceding vehicle following control without continuing the lane keeping control by executing the division line complementation processing. In other words, the ECU 20 will switch the control operation from the lane keeping control to the preceding vehicle following control without performing the complementation processing if the width of the travel lane is recognized to be abnormal.

On the other hand, if it is determined that the predetermined condition is not satisfied due to a factor other than the width recognition result (NO in step S107), the ECU 20 will perform division line complementation processing (step S106) and switch the control operation to the preceding vehicle following control at a timing at which the counter value has reached the threshold (NO in step S110→step S111).

According to this processing example, since the ECU 20 will switch the control operation from the lane keeping control to the preceding vehicle following control without performing the complementation processing in a case in which the width of the travel lane is recognized to be abnormal, the control operation can be switched to the preceding vehicle following control at an earlier timing. Therefore, the behavior of the vehicle 1 can be stabilized more effectively.

<Processing Example 3 of Control Unit 2>

Figure 5:
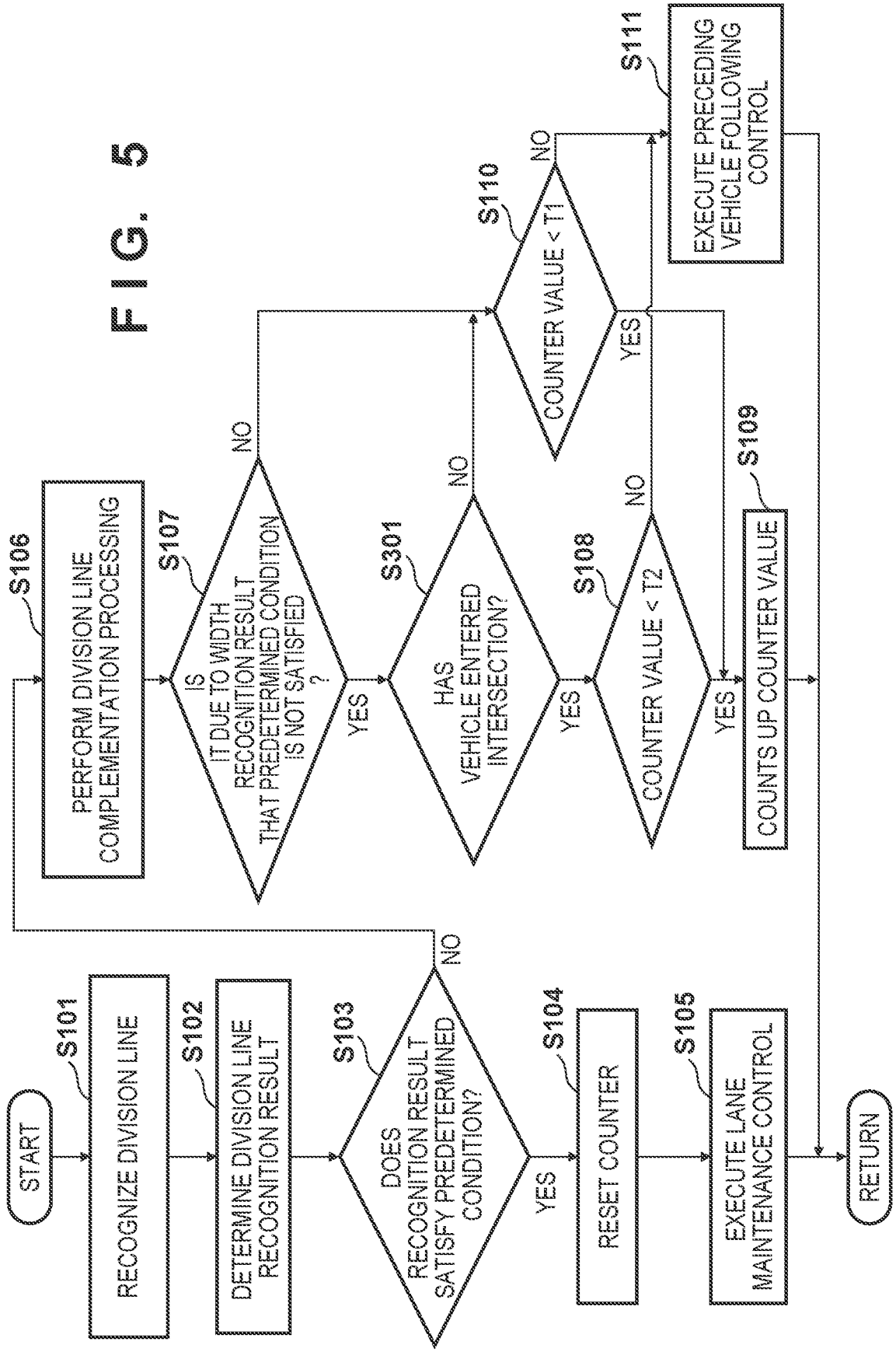
FIG. 5 is a flowchart showing an example of processing of the control unit.

FIG. 5 is a flowchart showing an example of processing of the control unit 2, and shows an example of processing performed when the vehicle 1 is traveling by automated driving. A processing example 3 differs from the processing example 1 in the point that, even in a case in which the predetermined condition is not satisfied due to the width recognition result, the control operation will not be switched to the preceding vehicle following control at an early timing when the vehicle 1 has not entered an intersection. A description of arrangements similar to those of the processing example 1 will be omitted hereinafter.

The procedure of processing from step S101 to step S107 is similar to that of the processing example 1.

However, in a case in which "YES" is determined in step S107, the ECU 20 will advance the process to step S301 instead of step S108 to confirm whether the vehicle 1 has entered an intersection. If it is determined that the vehicle 1 has entered the intersection, the ECU 20 will advance the process to step S108. If it is determined that the vehicle 1 has not entered the intersection, the process will advance to step S110.

In one example, the ECU 20 can confirm, based on the map information obtained by the communication device 24c, whether the vehicle 1 has entered an intersection. Whether the self-vehicle has entered an intersection can also be confirmed by the ECU 20 by causing the ECU 22 or the ECU 23 to analyze an image captured by the corresponding camera 41 and recognizing a traffic light, a stop sign, or the like. The procedure of processing from step S108 to step S111 is similar to that of the processing example 1.

According to this processing example, even in a case in which the width of the travel lane is recognized to be abnormal, the ECU 20 will not switch the control operation to the preceding vehicle following control at an early timing when the vehicle 1 has not entered an intersection. In other words, the ECU 20 will switch the control operation to the preceding vehicle following control at an early timing in a case in which the width of the travel lane is recognized to be abnormal and the vehicle 1 has entered an intersection. Hence, the ECU 20 can switch the control operation to the preceding vehicle following control at an early timing when the vehicle 1 has entered an intersection where wavering of the vehicle 1 can easily occur due to an erroneous recognition of the division line (see the travel track 62 of the comparative example shown in FIG. 3). Therefore, the control operation can be switched from the lane keeping control to the preceding vehicle following control at a more appropriate timing. Note that the process of step S108 may be omitted in a manner similar to the processing example 2 in this processing example as well. In such a case, if "YES" is determined in step S301, the ECU 20 can advance the process to step S111. This will allow the control operation to be switched to the preceding vehicle following control at an earlier timing when the self-vehicle is to enter an intersection.

<Processing Example 4 of Control Unit 2>

FIG. 6 is a flowchart showing an example of processing of the control unit 2, and shows an example of processing performed when the vehicle 1 is traveling by automated driving. A processing example 4 differs from the processing example 1 in the point that, even in a case in which the predetermined condition is not satisfied due to a factor other than the width recognition result, the control operation will be switched to the preceding vehicle following control at an early timing when the vehicle 1 has entered an intersection. A description of arrangements similar to those of the processing example 1 will be omitted hereinafter.

The procedure of processing from step S101 to step S107 is similar to that of the processing example 1. However, in a case in which "NO" is determined in step S107, the ECU 20 will advance the process to step S401 instead of step S110 to confirm whether the vehicle 1 has entered an intersection. If it is determined that the vehicle 1 has entered an intersection, the ECU 20 will advance the process to step S108. If it is determined that the vehicle 1 has not entered an intersection, the process will advance to step S110. The procedure of processing from step S108 to step S111 is similar to that of the processing example 1.

According to this processing example, even in a case in which an abnormality that has been caused by a factor other than the width of the travel lane has been recognized, the ECU 20 will switch the control operation to the preceding vehicle following control at an early timing when the vehicle 1 has entered an intersection. In other words, as long as the vehicle 1 has entered an intersection, the ECU 20 will switch the control operation to the preceding vehicle following control regardless of the factor by which the predetermined condition is not satisfied. Hence, even in a case in which the ECU 22 cannot recognize the division line (lost division line) or can recognize only a division line near the vehicle 1, the ECU 20 will also switch the control operation to the preceding vehicle following control at an early timing when the self-vehicle has entered an intersection. Therefore, it will be possible to switch the control operation from the lane keeping control to the preceding vehicle following control at a more appropriate timing.

Note that in this processing example, as long as the vehicle 1 has entered an intersection, the ECU 20 will switch the control operation to the preceding vehicle following control regardless of the factor by which the predetermined condition is not satisfied (step S401→step S108→step S111). However, in a case in which the predetermined condition is not satisfied due to a factor other than an abnormality in the width of the travel lane and if the vehicle 1 has entered an intersection and recognition of the division line becomes impossible due to a factor specific to the intersection, the ECU 20 may switch the control operation to the preceding vehicle following control at an early timing.

For example, since a crossroad will be present in front of the vehicle 1 at an intersection, both the division lines and a roadside object such as a guardrail, a curbstone, or the like will be interrupted when viewed in the direction of travel of the vehicle 1. Hence, in a case in which the predetermined condition ceases to be satisfied due to the fact that the ECU 22 could recognize neither the division lines nor the roadside object such as a guardrail, a curbstone, or the like, the ECU 20 can switch the control operation to the preceding vehicle following control at an early timing.

In addition, for example, since each division line will spread to the side of the crossroad at an intersection, the division lines will become interrupted while spreading to both sides when viewed in the direction of travel of the vehicle 1. Hence, in a case in which the predetermined condition ceases to be satisfied due to the fact that the recognition of the division line has stopped while the width of the division line was increasing, the ECU 20 can switch the control operation to the preceding vehicle following control at an early timing. Note that the process of step S108 can be omitted in a manner similar to the processing example 2 in this processing example as well. In such a case, if "YES" is determined in step S301, the ECU 20 can advance the process to step S111. This will allow the control operation to be switched to the preceding vehicle following control at an earlier timing when the self-vehicle is to enter an intersection.

OTHER EMBODIMENTS

Although the above-described embodiment described an example in which the ECU 20 executes the automated driving control of the vehicle 1, the processing according to the above-described embodiment can also be executed when driving support is to be performed. That is, the processing according to the above-described embodiment can be executed regardless of the degree of automated driving or the degree of driving support.

Furthermore, in a case in which the preceding vehicle following control cannot be executed, in relation to the switch from the lane keeping control to the preceding vehicle following control, because the camera 41 or the like cannot capture the preceding vehicle or a predetermined length or more of the track of the preceding vehicle cannot be obtained, the driver may be notified of the fact that the automated driving cannot be continued without switching the control operation to the preceding vehicle following control or alternative processing, such as lowering the degree of automated driving or driving support, may be executed. For example, the ECU 20 may confirm, before executing the process of step S111, whether the preceding vehicle following control can be executed. If it is determined that the preceding vehicle following control can be executed, the process may advance to step S111. If it is determined that the preceding vehicle following control cannot be executed, a travel control takeover request may be issued to the driver. Also, in a case in which the preceding vehicle following control cannot be executed, the ECU 20 may, for example, decelerate the vehicle 1 or stop the vehicle 1 at a position where the self-vehicle can be stopped. Note that a case in which a predetermined length or more of the track of the preceding vehicle cannot be obtained can be a state in which a predetermined length or more of the track of the preceding vehicle has not been stored in the memory or the like of the ECU 22. Note that as one example, the ECU 20 may determine that a predetermined length or more of the track of the preceding vehicle has been obtained in a case in which 5 m to 30 m or more of the track of the preceding vehicle has been obtained.

In addition, although the timing at which the control operation is switched from the lane keeping control to the preceding vehicle following control is determined by a counter in the above-described embodiment, the mode in which the timing of the switch is determined is not limited to this. For example, the timing of the switch may be determined by a timer or the like.

Summary of Embodiment

The above-described embodiment discloses at least a travel control apparatus, a vehicle, a travel control method, and a non-transitory computer-readable program as follows.
1. A travel control apparatus (for example, 2) according to the above-described embodiment comprises
   a recognition unit (for example, 22) configured to recognize a division line of a road on which a self-vehicle is traveling; and
   a control unit (for example, 20) configured to execute, based on a recognition result of the division line by the recognition unit, first control to perform lane keeping of the self-vehicle, wherein in a case in which the recognition result ceases to be satisfied a
   predetermined condition, the control unit will switch, at a first timing after the division line recognized by the recognition unit has been complemented and the first control has been continued, control to be executed from the first control to second control to follow a preceding vehicle of the self-vehicle (for example, S110, S111), and
   even in a case in which the recognition result ceases to be satisfied the predetermined condition, if the predetermined condition ceases to be satisfied due to a recognition result of a width of a travel lane of the self-vehicle, the control unit will switch the control to be executed from the first control to the second control at a second timing earlier than the first timing (for example, S108, S111).

According to this embodiment, the control operation is switched to the second control at an early timing in a case in which a predetermined condition ceases to be satisfied due to the width of a travel lane. Hence, the control operation can be switched from the lane keeping control to the preceding vehicle following control at a more appropriate timing, and the behavior of the vehicle in the vehicle width direction can be stabilized in a case in which the width has become abnormal.
2. According to the above-described embodiment, a case in which the recognition result ceases to be satisfied the predetermined condition due to the width of the travel lane of the self-vehicle is one of a case in which the width falls outside a predetermined range and a case in which an amount of change of the width exceeds a threshold.

According to this embodiment, the control operation can be switched from the lane keeping control to the preceding vehicle following control at a more appropriate timing in a case in which the width has become abnormal, and the behavior of the vehicle in the vehicle width direction can be stabilized.
3. According to the above-described embodiment, a case in which the recognition result ceases to be satisfied the predetermined condition due to the width of the travel lane of the self-vehicle is a case in which the width has increased beyond a threshold.

According to this embodiment, the control operation is switched from the lane keeping control to the preceding vehicle following control at an early timing in a case in which the width has rapidly increased. Hence, the control can be switched appropriately in a case in which there is a recognition error or the like due to an increase in the number of lanes or the like, and the behavior of the vehicle in the vehicle width direction can be stabilized in a case in which the width has become abnormal.
4. According to the above-described embodiment, even in a case in which the recognition result ceases to be satisfied the predetermined condition, the control unit will switch the control to be executed from the first control to the second control at the first timing when the self-vehicle has not entered an intersection (for example, S301, S110, S111).

According to this embodiment, the control operation can be appropriately switched from the lane keeping control to the preceding vehicle following control in a state in which a recognition error of the width can easily occur due to the influence of a lane dedicated to a right turn (or left turn) when the self-vehicle has entered an intersection or the like.
5. According to the above-described embodiment, when the self-vehicle has entered an intersection, the control unit will switch the control to be executed from the first control to the second control at the second timing even in a case in which the recognition result ceases to be satisfied the predetermined condition due to a factor other than the width (for example, S401, S108, S111).

According to this embodiment, in a state in which the recognition unit has lost the division line when the self-vehicle has entered an intersection or the like, the control operation can be appropriately switched from the lane keeping control to the preceding vehicle following control, and the behavior of the vehicle in the vehicle width direction can be stabilized.
6. According to the above-described embodiment, in a case in which the predetermined condition ceases to be satisfied due to a fact that neither the division line nor a roadside object of the road could be recognized, the control unit will switch the control to be executed from the first control to the second control at the second timing.

According to this embodiment, in a state in which the recognition unit has lost the division line when the self-vehicle has entered an intersection or the like, the control operation can be appropriately switched from the lane keeping control to the preceding vehicle following control.
7. According to the above-described embodiment, in a case in which the predetermined condition ceases to be satisfied due to a fact that the division line ceases to be recognized while the width of the travel lane of the self-vehicle has increased, the control unit will switch the control to be executed from the first control to the second control at the second timing.

According to this embodiment, in a state in which the recognition unit has lost the division line when the self-vehicle has entered an intersection or the like, the control operation can be appropriately switched from the lane keeping control to the preceding vehicle following control.
8. According to the above-described embodiment, in a case in which the recognition result ceases to be satisfied the predetermined condition and if the second control cannot be executed due to one of a state in which a preceding vehicle cannot be captured and a predetermined length or more of a track of the preceding vehicle cannot be obtained, the control unit will execute processing which is an alternative to the second control.

According to this embodiment, in a case in which the second control cannot be executed, the control unit can execute processing which is an alternative to the second control.

9. A vehicle (for example, 1) according to the above-described embodiment incorporates a travel control apparatus defined in one of 1. to 7. described above.

According to this embodiment, a vehicle that can appropriately switch the control operation from the lane keeping control to the preceding vehicle following control can be provided.

10. A travel control method according to the above-described embodiment comprises
recognizing (for example, S101) a division line of a road on which a self-vehicle is traveling; and
executing (for example, S102-S111), based on a recognition result of the division line obtained in the recognizing, first control to perform lane keeping of the self-vehicle,
wherein in the executing,
in a case in which the recognition result ceases to be satisfied a predetermined condition, control to be executed will be switched, at a first timing after the division line recognized in the recognizing has been complemented and the first control has been continued, from the first control to second control to follow a preceding vehicle of the self-vehicle (for example, S110, S111), and
even in a case in which the recognition result ceases to be satisfied the predetermined condition, if the predetermined condition ceases to be satisfied due to a recognition result of a width of a travel lane of the self-vehicle, the control to be executed will be switched from the first control to the second control at a second timing earlier than the first timing (for example, S108, S111).

According to this embodiment, the control operation is switched to the second control at an early timing in a case in which a predetermined condition ceases to be satisfied due to the width of a travel lane. Hence, the control operation can be switched from the lane keeping control to the preceding vehicle following control at a more appropriate timing, and the behavior of the vehicle in the vehicle width direction can be stabilized in a case in which the width has become abnormal.

11. A non-transitory computer-readable storage medium, according to the above-described embodiment, storing a program for causing a computer to function as each unit of
a recognition unit (for example, S101) configured to recognize a division line of a road on which a self-vehicle is traveling; and
a control unit (for example, S102-S111) configured to execute, based on a recognition result of the division line by the recognition unit, first control to perform lane keeping of the self-vehicle,
wherein in a case in which the recognition result ceases to be satisfied a predetermined condition, the control unit will switch, at a first timing after the division line recognized by the recognition unit has been complemented and the first control has been continued, control to be executed from the first control to second control to follow a preceding vehicle of the self-vehicle (for example, S110, S111), and
even in a case in which the recognition result ceases to be satisfied the predetermined condition, if the predetermined condition ceases to be satisfied due to a recognition result of a width of a travel lane of the self-vehicle, the control unit will switch the control to be executed from the first control to the second control at a second timing earlier than the first timing (for example, S108, S111).

According to this embodiment, the control operation is switched to the second control at an early timing in a case in which a predetermined condition ceases to be satisfied due to the width of a travel lane. Hence, the control operation can be switched from the lane keeping control to the preceding vehicle following control at a more appropriate timing, and the behavior of the vehicle in the vehicle width direction can be stabilized in a case in which the width has become abnormal.

The present invention is not limited to the above-described embodiment, and various changes and modifications can be made within the spirit and scope of the present invention.

What is claimed is:

1. A travel control apparatus comprising:
a camera configured to capture an outside image in front of a self-vehicle; and
a control circuit including at least one processor and at least one storage device and configured to execute first control to perform lane keeping of the self-vehicle based on a recognition result of a division line of a road on which the self-vehicle is traveling based on the outside image, and second control to perform steering control that follows a preceding vehicle of the self-vehicle,
wherein the control circuit is configured to:
determine based on the outside image whether or not the self-vehicle has entered an intersection;
switch control to be executed from the first control to the second control at a first timing from when the recognition result of the division line of the road, based on the outside image, is changed from a recognition state to an unrecognition state in a case in which the self-vehicle has not entered the intersection,
switch the control to be executed from the first control to the second control at a second timing from when the recognition result of the division line of the road, based on the outside image, is changed from the recognition state to the unrecognition state in a case in which the self-vehicle has entered the intersection, and
the second timing is earlier than the first timing so that a traveling distance, in a longitudinal direction of the road, of the self-vehicle in the first control after the recognition result of the division line of the road has changed from the recognition state to the unrecognition state in a case in which the self-vehicle has entered the intersection is shorter than the traveling distance in a case in which the self-vehicle has not entered the intersection.

2. The apparatus according to claim 1, wherein it is determined that the division line of the road is not recognized in a case in which a width of the road falls outside a predetermined range or a case in which an amount of change of the width exceeds a threshold.

3. The apparatus according to claim 1, wherein it is determined that the division line of the road is not recognized in a case in which a width of the road has increased beyond a threshold.

4. The apparatus according to claim 1, wherein it is determined that the division line of the road is not recognized in a case in which neither the division line nor a roadside object of the road could be recognized.

5. The apparatus according to claim 1, wherein it is determined that the division line of the road is not recognized in a case in which the division line ceases to be recognized while the width of the travel lane of the self-vehicle has increased.

6. The apparatus according to claim 1, wherein the control circuit executes processing which is an alternative to the second control at the second timing from when the recognition result of the division line of the road is changed from the recognition state to the unrecognition state in a case in which the self-vehicle has entered the intersection, and the second control cannot be executed.

7. The apparatus according to claim 1, wherein in the first control, the lane keeping is continued using a past recognition result of the division line of the road.

8. A vehicle, comprising:
a camera configured to capture an outside image in front of the vehicle; and
a control circuit including at least one processor and at least one storage device and configured to execute first control to perform lane keeping of the vehicle based on a recognition result of a division line of a road on which the vehicle is traveling based on the outside image, and second control to perform steering control that follows a preceding vehicle of the vehicle,
wherein the control circuit is configured to:
determine based on the outside image whether or not the vehicle has entered an intersection;
switch control to be executed from the first control to the second control at a first timing from when the recognition result of the division line of the road, based on the outside image, is changed from a recognition state to an unrecognition state in a case in which the vehicle has not entered the intersection,
switch the control to be executed from the first control to the second control at a second timing from when the recognition result of the division line of the road, based on the outside image, is changed from the recognition state to the unrecognition state in a case in which the vehicle has entered the intersection, and
the second timing is earlier than the first timing so that a traveling distance, in a longitudinal direction of the road, of the vehicle in the first control after the recognition result of the division line of the road has changed from the recognition state to the unrecognition state in a case in which the vehicle has entered the intersection is shorter than the traveling distance in a case in which the vehicle has not entered the intersection.

9. A vehicle control method comprising:
recognizing a division line of a road on which a self-vehicle is traveling based on an outside image in front of the self-vehicle;
determining based on the outside image whether or not the self-vehicle has entered an intersection;
switching control to be executed from a first control to perform lane keeping of the self-vehicle based on a recognition result in the recognizing to a second control to perform steering control that follows a preceding vehicle of the self-vehicle at a first timing from when a recognition result of the division line of the road is changed from a recognition state to an unrecognition state in a case in which the self-vehicle has not entered the intersection; and
switching the control to be executed from the first control to the second control at a second timing from when the recognition result of the division line of the road is changed from the recognition state to the unrecognition state in a case in which the self-vehicle has entered the intersection, and
the second timing is earlier than the first timing so that a traveling distance, in a longitudinal direction of the road, of the self-vehicle in the first control after the recognition result of the division line of the road has changed from the recognition state to the unrecognition state in a case in which the self-vehicle has entered the intersection is shorter than the traveling distance in a case in which the self-vehicle has not entered the intersection.

* * * * *